United States Patent [19]

Colli

[11] 4,038,372

[45] July 26, 1977

[54] PROCESS FOR MANUFACTURING CHLORAMINE

[75] Inventor: Albert J. Colli, Oxon Hill, Md.

[73] Assignee: The United States of America as represented by the Secretary of the Navy, Washington, D.C.

[21] Appl. No.: 683,451

[22] Filed: May 5, 1976

[51] Int. Cl.² ............................................. C01B 21/18
[52] U.S. Cl. .................................... 423/413; 23/284
[58] Field of Search ............... 423/413, 351, 337, 471, 423/613, 623; 23/284

[56] References Cited

U.S. PATENT DOCUMENTS

| | | | |
|---|---|---|---|
| 2,837,409 | 6/1958 | Sisler et al. ........................... | 423/413 |
| 3,009,783 | 11/1961 | Sheer et al. ........................... | 423/450 |
| 3,038,785 | 6/1962 | Braude et al. ......................... | 423/413 |
| 3,078,144 | 2/1963 | Bown et al. ........................... | 423/492 |
| 3,420,632 | 1/1969 | Ryan ................................... | 423/455 |
| 3,488,164 | 1/1970 | Grushkin et al. ..................... | 423/413 |

Primary Examiner—Edward J. Meros
Attorney, Agent, or Firm—R. S. Sciascia; A. L. Branning; H. B. Field

[57] ABSTRACT

Chloramine is continuously manufactured on a large scale by reacting gaseous chlorine with gaseous ammonia. Recovery of the chloramine is then effected by purging the area adjacent to the reactor discharge zone with either an inert gas or ammonia, and entraining the product steam in a high velocity jet of a cooling gas.

20 Claims, 1 Drawing Figure

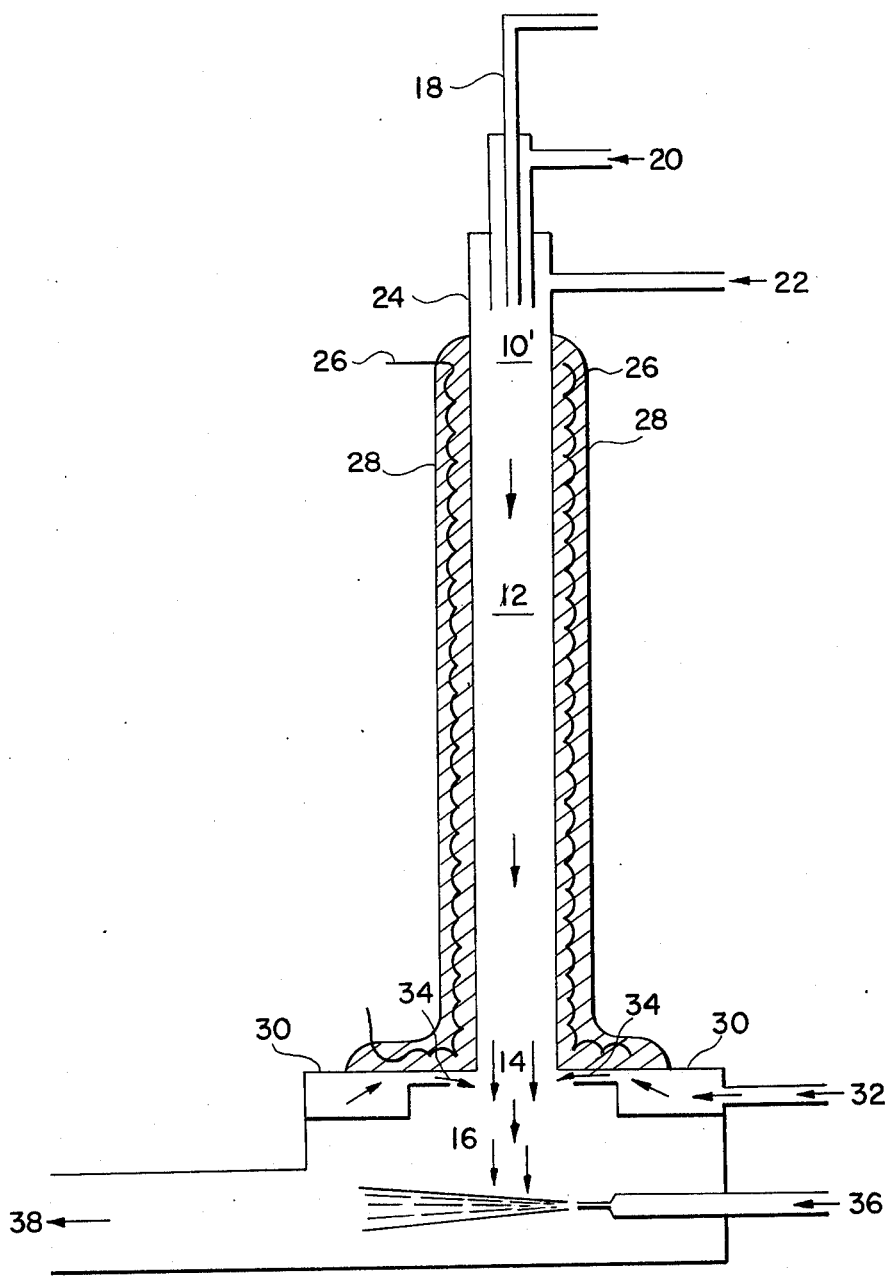

4,038,372

PROCESS FOR MANUFACTURING CHLORAMINE

BACKGROUND OF THE INVENTION

This invention relates to a process and apparatus for producing an inorganic compound and more specifically to a process and apparatus for producing chloramine.

Unsymmetrical dimethyl hydrazine is known to be a useful material for rocket fuel and agricultural purposes. One possible way of forming unsymmetrical dimethyl hydrazine is to react chloramine with dimethyl amine. Thus, it appears that chloramine is a useful intermediate for forming unsymmetrical dimethyl hydrazine which in turn is a highly desirable product.

One of the most efficient processes for forming chloramine is the reaction of chlorine gas with ammonia. This is described in U.S. Pat. No. 2,837,409 to Sisler et al and in U.S. Pat. No. 3,488,164 to Grushkin et al herein incorporated by reference. The chlorine/ammonia reaction is especially effective if it is carried out by introducing gaseous chlorine into a large excess of gaseous ammonia, immediately mixing the reactants and withdrawing them from the reaction zone so that there is little opportunity for the chloramine to come in contact with unreacted chlorine. Although a highly desirable reaction, there are many problems encountered when gaseous chlorine and gaseous ammonia are combined. One such problem is the creation of the undesirable by-product ammonium chloride. To prevent or minimize this formation of the ammonium chloride, the reaction must take place at a temperature above the vaporization temperature of ammonium chloride which is about 650° F (343° C). A second problem encountered by this reaction is recovering the product while concurrently preventing the ammonium chloride from plugging the apparatus and thereby fostering further decomposition of chloramine. This product recovery can be accomplished by keeping the products away from the hardware in the discharge zone and rapidly reducing product temperature.

Although the gaseous chlorine/ammonia reaction has been made to work in the laboratory for limited periods of time, the aforementioned problems, as well as other problems associated with scaleup have prevented the preparation of chloramine in an economical full scale operation.

SUMMARY OF THE INVENTION

Accordingly, the present invention provides a full scale method for the continuous production of chloramine by the gaseous reaction of chlorine and ammonia at about 680° F. The products are then removed from the reaction discharge zone by purging the area with either an inert gas or ammonia thereby preventing the deposition and degradation of ammonium chloride by heated surfaces, and entraining the product stream in a high velocity jet of cooling gas.

The present invention also provides the apparatus to accomplish the full scale continuous production of chloramine.

OBJECTS OF THE INVENTION

Therefore, it is an object of the present invention to provide a full scale continuous process for the production of chloramine.

It is a further object of the present invention to provide means of preventing build ups and plugging of the chloramine reactor.

Another object of the present invention is to provide an improved method of removing impurities from the chloramine product.

Yet another object of the present invention is to provide the apparatus for the full scale continuous production of chloramine.

Still a further object of the present invention is to provide the apparatus which prevents build up and plugging of the chloramine reactor.

It is still a further object of the present invention to provide the apparatus for removing impurities from the chloramine product.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

The FIGURE is a diagramatic cross-sectional view of the chloramine reactor and recovery system.

DESCRIPTION OF THE PREFERRED EMBODIMENTS

A continuous full scale reactor for the production of chloramine consists basically of an entrance zone 10, a reaction zone 12, a discharge zone 14, and a recovery zone 16. Gaseous chlorine and an inert gas such as nitrogen are axially introduced into the entrance zone 10 of the heated elongated reactor tube 24 through concentric inlets. The chlorine gas is fed through the middle inlet tube 18 while the inert gas is fed through the outer concentric tube 20. Gaseous ammonia is simultaneously introduced into the entrance zone 10 through at least one inlet 22 placed radially to and upstream of said chlorine inlet 18, and situated so that said gaseous chlorine and said inert gas are introduced into a flowing body of gaseous ammonia. It is also possible to introduce the ammonia through a third outermost concentric inlet provided however, that it is likewise upstream of the inert gas and chlorine inlets. Either of these inlet tube orientations will prevent ammonium chloride from building up on the chlorine inlet tube 18 and thereby prevent reactor shut down.

Complete and rapid mixture of the gaseous reactants is effected by achieving turbulent flow in the reactor tube 24, wherein the Reynold's Number should lie between about 2500 and 10,000. To insure complete mixture, the reactor zone 12 should be sized so that it is between 10 and 22 tube diameters in length. Fifteen tube diameter is recognized as the optimum length to achieve a thorough mixture of reactants. Actual reactor tube 24 diameter is only limited by the product volumetric flow rate desired, however, a diameter ranging from about ¼ inch to about 2 inches is functional and about ⅝ of an inch appears to be preferred.

As the reactants mix, they flow through the heated reaction zone 12 forming the product chloramine and by-product ammonium chloride. The heating of this reactor zone 12 can be achieved through any conventional means such as pressurized steam or electrically. However, one of the most efficient methods is to wrap the reactor tube with a high resistivity wire 26, 26, such as Nichrome wire, embedded in a thermally conductive and electrically insulating material such as refractory cement 28, 28. During operation, the reactor zone 12 and the bottom plate 30 in close proximity to the discharge zone 14, are heated to a temperature between about 650° F and about 720° F although 680° F is apparently most efficient. This is done to prevent the by-product ammonium chloride from depositing in the reactor tube 24 or any hardware adjacent to the discharge zone 14.

Inert gas such as nitrogen or gaseous ammonia is introduced as a purging gas into the recovery zone 16 through at least one inlet 32 adjacent to and circumscribing the discharge zone 14. By purging this area with a small flow of gas through the annulus 34, 34 solids are prevented from contacting heated surfaces, the bottom plate 30 adjacent to the reactor can be maintained above about 650° F, and down stream piping, which the salt can harmlessly contact, can be easily kept at a cooler temperature.

After purging, the product stream is entrained in a high velocity jet of entraining gas which may flow at a linear rate of between about 500 and about 1200 feet per second. The optimum velocity is considered to be about 700 feet per second. This gas cools the product stream to below about 350° F and above ambient, prevents decompositions of chloramine, and achieves essentially complete condensation of the ammonium chloride. The cooling and entraining gas can be either gaseous ammonia or an inert gas such as nitrogen and it is introduced into the recovery zone 16 through at least one nozzled inlet tube 36. The use of a high velocity jet causes the product stream to be effectively dispersed, mixed with the cooler gas, and carried to an appropriate filter system 38 such as teflon cloth wherein product separation is effected.

Thus it is apparent that there is provided by this invention a rapid, full scale, economical process for producing chloramine.

It is to be understood that what has been described is merely illustrative of the principles of the invention and that numerous arrangements in accordance with this invention may be devised by one skilled in the art without departing from the spirit and scope thereof.

What is claimed as new and desired to be secured by Letters Patent of the U.S. is:

1. A process for the continuous production of chloramine comprising:
   introducing chlorine, ammonia, and an inert gas into a reactor tube;
   heating the reactor tube;
   turbulently flowing said gases through said reactor tube;
   reacting the chlorine and the ammonia to form the chloramine product;
   introducing a purging gas into the reactor discharge zone;
   entraining the product stream in a high velocity jet of a cooling gas; and
   recovering the chloramine.

2. The process of claim 1 wherein said chlorine and said inert gas are introduced into a flowing body of gaseous ammonia.

3. The process of claim 2 wherein:
   the chlorine, the ammonia, and the inert gas are introduced into the reactor concentrically;
   the chlorine is centrally introduced;
   the inert gas is annularly introduced, and
   the ammonia forms the outermost circle when introduced into the reactor.

4. The process of claim 2 wherein said inert gas and said gaseous chlorine are introduced into the reactor through concentric inlets wherein said chlorine flows through the centermost inlet and said inert gas flows through the outer concentric inlet, and wherein said gasous ammonia is radially introduced into said reactor upstream of said chlorine and said inert gas inlets.

5. The process of claim 1 wherein said inert gas is nitrogen.

6. The process of claim 1 wherein said heating is electrical.

7. The process of claim 6 wherein said electrical heating means is surrounded by a thermally conductive electrically insulating material.

8. The process of claim 1 wherein the Reynolds Number for said turbulently flowing gaseous ammonia, chlorine and said inert gas lies between about 2,500 and about 10,000.

9. The process of claim 1 wherein said purging gas is an inert gas or ammonia.

10. The process of claim 9 wherein said inert gas is nitrogen.

11. The process of claim 1 wherein said entraining gas is an inert gas or ammonia.

12. The process of claim 11 wherein said inert gas is nitrogen.

13. In a continuous process for the manufacture of chloramine, wherein gaseous chlorine and a gaseous inert diluent such as nitrogen are axially introduced into the entrance zone of a heated elongated reactor through two coaxial inlets such that said gaseous chlorine flows through the central inlet while said inert diluent gas flows through the outer inlet, gaseous ammonia is simultaneously introduced into the entrance zone through at least one inlet placed radially to and upstream of said chlorine inlet and situated so that said gaseous chlorine is discharged into a flowing body of ammonia, then reacting said chlorine and said ammonia so as to produce chloramine and the by-product ammonium chloride, the improvement which comprises:
   sizing the reaction zone of said reactor so that it is between 10 and 22 tube diameters in length;
   heating said reaction zone to above the vaporization temperature of ammonium chloride and below 720° F;
   turbulently flowing said ammonia, chlorine and inert gas through said reactor so that complete reactant mixture is achieved;
   thoroughly reacting said reactants;
   purging the area adjacent to the discharge zone with either an inert gas or ammonia to prevent the deposition and degradation of ammonium chloride by heated surfaces; and
   entraining the stream discharging from the reactor in a high velocity jet of a cooling gas of either an inert gas or ammonia to effectively reduce the temperature of the process stream and to carry said process stream to a filter system.

14. The process of claim 13 wherein said reaction zone is 15 tube diameters in length.

15. The process of claim 13 wherein said reaction zone is heated to about 680° F.

16. The process of claim 13 wherein the velocity of said jet of cooling gas is in the turbulent region.

17. The process of claim 16 wherein the velocity of said cooling gas is between 500 and 1200 linear feet per second.

18. The process of claim 17 wherein the velocity of said cooling gas is 700 linear feet per second.

19. The process of claim 13 wherein said products are cooled to a temperature between 350° F and ambient prior to filtration.

20. The process of claim 13 wherein said filter medium is teflon cloth.

* * * * *